US009094139B2

(12) United States Patent
Pahuja

(10) Patent No.: US 9,094,139 B2
(45) Date of Patent: Jul. 28, 2015

(54) LOOK AHEAD METRICS TO IMPROVE BLENDING DECISION

(75) Inventor: Ashwini Pahuja, Albertson, NY (US)

(73) Assignee: iBiquity Digital Corporation, Columbia, MD (US)

( * ) Notice: Subject to any disclaimer, the term of this patent is extended or adjusted under 35 U.S.C. 154(b) by 449 days.

(21) Appl. No.: 13/533,548

(22) Filed: Jun. 26, 2012

(65) Prior Publication Data

US 2013/0343576 A1 Dec. 26, 2013

(51) Int. Cl.
*H04B 1/00* (2006.01)
*H04H 40/36* (2008.01)

(52) U.S. Cl.
CPC .......... *H04H 40/36* (2013.01); *H04H 2201/18* (2013.01)

(58) Field of Classification Search
CPC ............ H04L 27/2657; H04L 27/0014; H04L 27/001; H04L 27/0012; H04L 27/0008; H04L 27/0006; H04L 27/0004; H04L 27/0002; H04L 27/00; H04B 1/0014; H04B 1/0032; H04B 1/005; H04B 1/0067; H04B 1/0071; H04J 1/05; H04J 1/18
USPC ............... 381/1-7, 10-23, 56, 61; 455/277.2, 455/283, 501, 63.1, 108, 114.2, 114.3, 137, 455/139, 140, 44, 45, 47, 59, 60, 61, 203, 455/204, 205; 700/94; 375/216, 346, 347, 375/349, 240, 260, 267, 268, 299; 370/486, 370/204
See application file for complete search history.

(56) References Cited

U.S. PATENT DOCUMENTS

| | | | | |
|---|---|---|---|---|
| 5,809,065 | A | 9/1998 | Dapper et al. | |
| 6,178,317 | B1 * | 1/2001 | Kroeger et al. | 455/296 |
| 6,259,893 | B1 | 7/2001 | Kroeger et al. | |
| 6,563,880 | B1 | 5/2003 | Hunsinger et al. | |
| 6,590,944 | B1 | 7/2003 | Kroeger | |
| 6,622,008 | B2 | 9/2003 | Kroeger et al. | |
| 6,671,340 | B1 | 12/2003 | Kroeger et al. | |
| 6,735,257 | B2 | 5/2004 | Kroeger | |
| 6,901,242 | B2 | 5/2005 | Kroeger et al. | |
| 6,970,685 | B2 | 11/2005 | Milbar et al. | |
| 7,221,688 | B2 | 5/2007 | Vanness | |
| 7,546,088 | B2 | 6/2009 | Kroeger et al. | |
| 7,933,368 | B2 | 4/2011 | Peyla et al. | |
| 2003/0182616 | A1 | 9/2003 | Kroeger et al. | |
| 2004/0261132 | A1 * | 12/2004 | Shimizu | 725/139 |
| 2006/0019601 | A1 | 1/2006 | Kroeger et al. | |
| 2007/0291876 | A1 * | 12/2007 | Shridhar et al. | 375/316 |
| 2010/0027719 | A1 | 2/2010 | Pahuja | |
| 2011/0274214 | A1 | 11/2011 | Shah et al. | |
| 2012/0108191 | A1 | 5/2012 | Henson | |

OTHER PUBLICATIONS

International Search Report and Written Opinion for PCT Application No. PCT/US2013/047858 mailed Jan. 31, 2014.
Texas Instruments, Real World Signal Processing, Product Bulletin, TMS320DRI300/350 HD Radio Digital Basebands, 2004.
International Preliminary Report on Patentability for PCT Application No. PCT/US2013/047858 mailed Dec. 31, 2014.

* cited by examiner

*Primary Examiner* — Leshui Zhang
(74) *Attorney, Agent, or Firm* — Terrelli, Cannatti, Chambers & Holland, LLP; Michael Rocco Cannatti

(57) ABSTRACT

A method and apparatus are provided for blending analog and digital portions of a composite digital audio broadcast signal by using look ahead metrics computed from previously received audio frames to guide the blending process and prevent unnecessary blending back and forth between analog and digital if the look ahead metrics indicate that future digital signal quality is degraded or impaired.

20 Claims, 9 Drawing Sheets

LOOK AHEAD METRICS TO IMPROVE BLENDING DECISION

BACKGROUND OF THE INVENTION

1. Field of the Invention

The present invention is directed in general to composite digital radio broadcast receivers and methods for operating same. In one aspect, the present invention relates to methods and apparatus for blending digital and analog portions of an audio signal in a radio receiver.

2. Description of the Related Art

Digital radio broadcasting technology delivers digital audio and data services to mobile, portable, and fixed receivers using existing radio bands. One type of digital radio broadcasting, referred to as in-band on-channel (IBOC) digital radio broadcasting, transmits digital radio and analog radio broadcast signals simultaneously on the same frequency using digitally modulated subcarriers or sidebands to multiplex digital information on an AM or FM analog modulated carrier signal. HD Radio™ technology, developed by iBiquity Digital Corporation, is one example of an IBOC implementation for digital radio broadcasting and reception. With this arrangement, the audio signal can be redundantly transmitted on the analog modulated carrier and the digitally modulated subcarriers by transmitting the analog audio AM or FM backup audio signal (which is delayed by the diversity delay) so that the analog AM or FM backup audio signal can be fed to the audio output when the digital audio signal is absent, unavailable, or degraded. In these situations, the analog audio signal is gradually blended into the output audio signal by attenuating the digital signal such that the audio is fully blended to analog as the digital signal become unavailable. Similar blending of the digital signal into the output audio signal occurs as the digital signal becomes available by attenuating the analog signal such that the audio is fully blended to digital as the digital signal becomes available.

Notwithstanding the smoothness of the blending function, blend transitions between analog and digital signals can degrade the listening experience when the audio differences between the analog and digital signals are significant. Accordingly, a need exists for improved method and apparatus for processing the digital audio to overcome the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
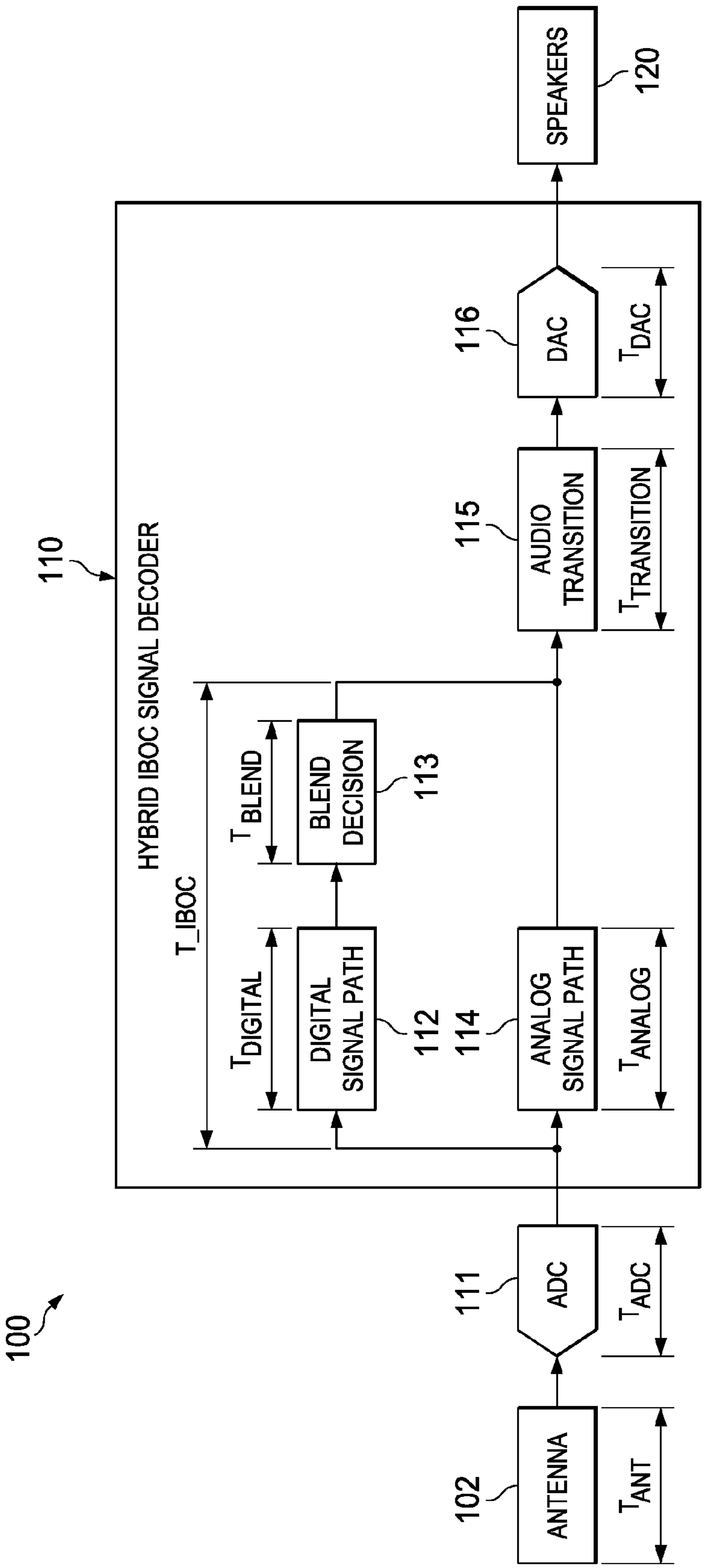
FIG. 1 illustrates a simplified timing block diagram of an exemplary digital broadcast receiver for aligning and blending digital and analog audio signals in accordance with selected embodiments.

A digital radio receiver apparatus and associated methods for operating same are described for efficiently blending digital and analog signals by using signal quality information extracted from previously received audio samples to prevent unnecessary blending back and forth between the analog and digital signals. In selected embodiments, signal quality values (e.g., signal-to-noise measures computed at each audio frame) are extracted over time from the received signal by the receiver's modem front end and stored for use by the receiver's back end processor to control the blending of digital and analog signals. Due to delays associated with the back processing of received signals, the stored signal quality values effectively provide the back end processor with advance or a priori knowledge of when the digital signal quality goes bad. The specific delays may be computed for one or more service modes and used to control the retrieval and use of stored signal quality values, where a service mode is a specific configuration of operating parameters specifying throughput, performance level, and selected logical channels. With this advance knowledge, the digital radio receiver may continue using the analog signal and refrain from blending back to digital if the stored signal quality values indicate that the digital signal is going bad. In this way, repetitive blending back and forth between a low bandwidth audio signal (e.g., analog audio signal) and a high bandwidth audio signal (e.g., digital IBOC signal) is prevented, thereby reducing unpleasant disruptions in the listening experience. In similar fashion, if the advance knowledge indicates that the received digital signal is bad and will get worse, the digital radio receiver may blend to analog and stay in analog longer instead of listening to artifacts generated as the digital signal degrades. In effect, the look ahead metrics provide a window into the future of a few seconds in duration (depending on the band and mode) so that "future" digital signal quality values guide the blend process with advance knowledge about the upcoming signal quality so that the blend algorithm can perform a better operation and provide a better user experience.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Referring now to FIG. 1, there is shown a simplified timing block diagram of an exemplary digital broadcast receiver 100 for aligning and blending digital and analog audio signals contained in a received hybrid radio broadcast signal in accordance with selected embodiments. Upon reception at the antenna 102, the received hybrid signal is processed for an amount of time $T_{ANT}$ which is typically a constant amount of time that will be implementation dependent. The received hybrid signal is then digitized, demodulated, and decoded by the IBOC signal decoder 110, starting with an analog-to-digital converter (ADC) 111 which processes the signal for an amount of time $T_{ADC}$ which is typically an implementation-dependent constant amount of time to produce digital samples which are down converted to produce lower sample rate output digital signals.

In the IBOC signal decoder 110, the digitized hybrid signal is split into a digital signal path 112 and an analog signal path 114 for demodulation and decoding. In the analog path 114, the received analog portion of the hybrid signal is processed for an amount of time $T_{ANALOG}$ to produce audio samples representative of the analog portion of the received hybrid signal, where $T_{ANALOG}$ is typically a constant amount of time that is implementation dependent. In the digital signal path 112, the hybrid signal decoder 110 acquires and demodulates the received digital IBOC signal for an amount of time $T_{DIGITAL}$, where $T_{DIGITAL}$ is a variable amount of time that will depend on the acquisition time of the digital signal and the demodulation times of the digital signal path 112. The acquisition time can vary depending on the strength of the digital signal due to radio propagation interference such as fading and multipath. The digital signal path 112 applies Layer 1 processing to demodulate the received digital IBOC signal using a fairly deterministic process that provides very little or no buffering of data based on a particular implementation. The digital signal path 112 then feeds the resulting data to one or more upper layer modules which decode the demodulated digital signal to maximize audio quality. In selected embodiments, the upper layer decoding process involves buffering of the received signal based on over-the-air conditions. In selected embodiments, the upper layer module (s) may implement a deterministic process for each IBOC service mode (MP1-MP3, MP5, MP6, MP11, MA1 and MA3). As depicted, the upper layer decoding process includes a blend decision module 113 which processes look ahead metrics obtained from the demodulated digital signal in the digital signal path 112 to guide the blending of the audio and analog signals in the audio transition or blending module 115. The time required to process the blend decision at the blend decision module 113 is a constant amount of time $T_{BLEND}$. In this example, the total time spent demodulating and decoding the digital IBOC signal $T_{IBOC}$ is deterministic for a particular implementation.

At the audio transition or blending module 115, the samples from the digital signal (provided via blend decision module 113) are aligned and blended with the samples from the analog signal (provided directly from the analog signal path 114) using guidance control signaling from the blend decision module 113 to avoid unnecessary blending from analog to digital if the look ahead metrics for the digital signal are not good. The time required to align and blend the digital and analog signals together at the audio transition module 115 is a constant amount of time $T_{TRANSITION}$. Finally, the combined digitized audio signal is converted into analog for rendering via the digital-to-analog converter (DAC) 116 during processing time $T_{DAC}$ which is typically a constant amount of time that will be implementation-dependent.

Figure 2:
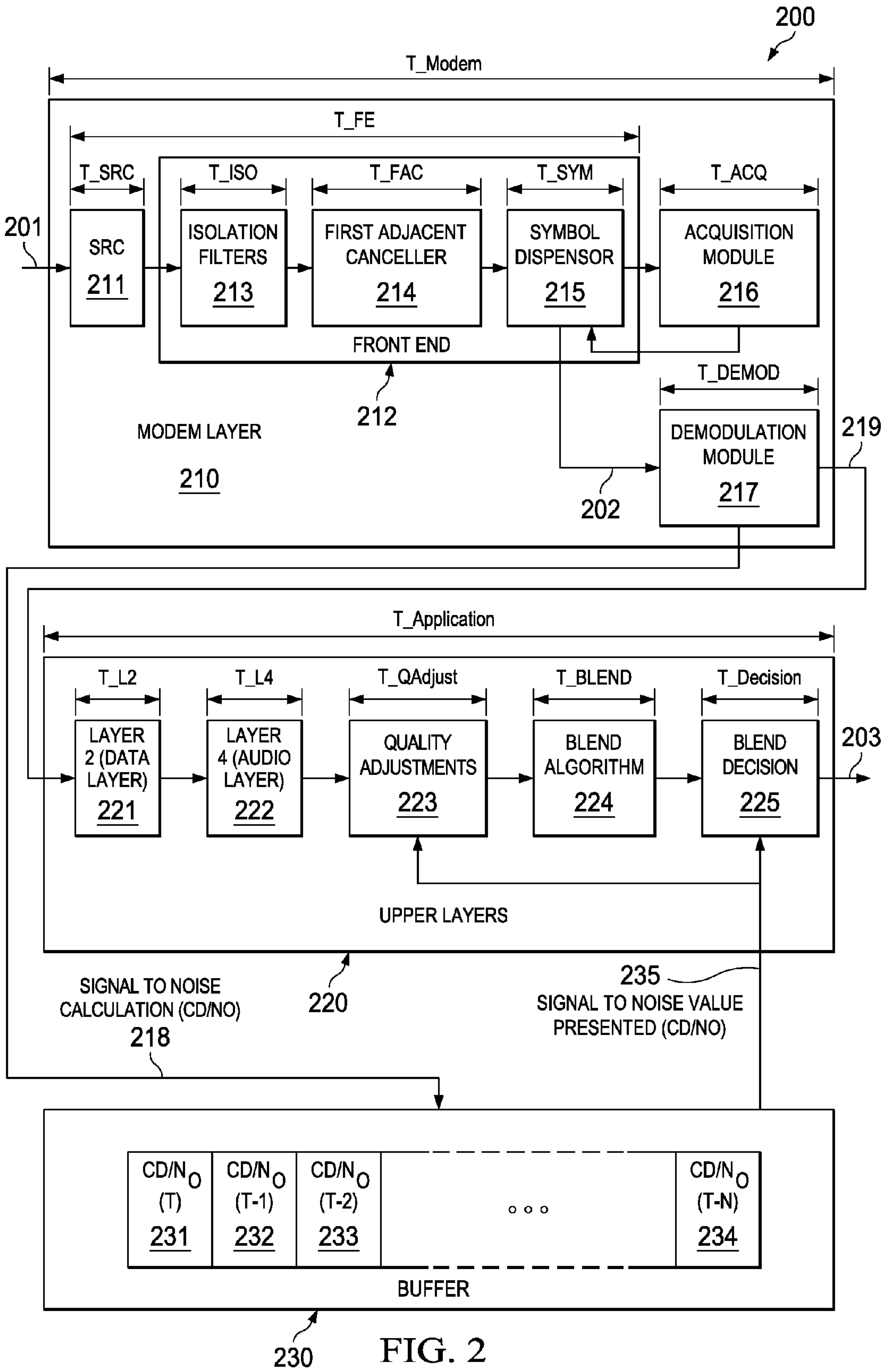
FIG. 2 illustrates a simplified timing block diagram of an exemplary digital broadcast receiver which calculates signal quality information for use as look ahead metrics for comparison to a threshold during blending of digital and analog audio FM signals in accordance with selected embodiments.

An exemplary functional block diagram of an exemplary digital broadcast receiver 200 for aligning and blending digital and analog audio signals is illustrated in FIG. 2 which illustrates functional processing details of a modem layer module 210 and application layer module 220. The functions illustrated in FIG. 2 can be performed in whole or in part in a baseband processor or similar processing system that includes one or more processing units configured (e.g., programmed with software and/or firmware) to perform the specified functionality and that is suitably coupled to one or more memory storage devices (e.g., RAM. Flash ROM, ROM). For example, any desired semiconductor fabrication method may be used to form one or more integrated circuits with a processing system having one or more processors and memory arranged to provide the digital broadcast receiver functional blocks for aligning and blending digital and analog audio signals.

As illustrated, the modem layer 210 receives signal samples 201 containing the analog and digital portions of the received hybrid signal which may optionally be processed by a Sample Rate Conversion (SRC) module 211 for a processing time $T_{SRC}$. Depending on the implementation, the SRC module 211 may or may not be present, but when included, the processing time $T_{SRC}$ is a constant time for that particular implementation. The digital signal samples are then processed by a front-end module 212 which filters and dispenses the digital symbols to generate a baseband signal 202. In selected example embodiments, the front-end module 212 may implement an FM front-end module which includes an isolation filter 213, a first adjacent canceler 214, and a symbol dispenser 215, depending on the implementation. In other embodiments, the front-end module 212 may implement an FM front-end module which includes only the symbol dispenser 215, but not the isolation filter 213 or first adjacent canceler 214. In an example FM front-end module 212, the digital signal samples are processed by the isolation filter 213 during processing time $T_{ISO}$ to filter and isolate the digital audio broadcasting (DAB) upper and lower sidebands. Next, the signal may be passed through an optional first adjacent canceler 214 during a processing time $T_{FAC}$ in order to attenuate signals from adjacent FM signal bands that might interfere with the signal of interest. Finally, attenuated FM signal (or AM signal) enters the symbol dispenser 215 which accumulates samples (e.g., with a RAM buffer) during a processing time $T_{SYM}$. From the symbol dispenser 215, baseband signals 202 are generated. Depending on the implementation, the isolation filter 213, the first adjacent canceler 214, and/or the symbol dispenser 215 may or may not be present, but when included, the corresponding processing time is constant for that particular implementation.

With FM receivers, an acquisition module 216 processes the digital samples from the front end module 212 during processing time $T_{ACQ}$ to acquire or recover OFDM symbol timing offset or error and carrier frequency offset or error from received OFDM symbols. When the acquisition module 216 indicates that it has acquired the digital signal, it adjusts the location of a sample pointer in the symbol dispenser 215 based on the acquisition time with an acquisition symbol offset feedback signal. The symbol dispenser 215 then calls the demodulation module 217.

The demodulation module 217 processes the digital samples from the front end module 212 during a processing time $T_{DEMOD}$ to demodulate the signal and present the demodulated data 219 for decoding to the application layer 220 for upper layer processing, where the total time application layer processing time $T_{Application}=T_{L2}+T_{L4}+T_{QADJUST}+T_{BLEND}+T_{DECISION}$. Depending on whether AM or FM demodulation is performed, the demodulation module 217 performs deinterleaving, code combining. FEC decoding, and error flagging of the received compressed audio data. In addition, the demodulation module 217 periodically determines and outputs a signal quality measure 218. In selected embodiments, the signal quality measure 218 is computed as signal-to-noise ratio values (CD/No) over time that are stored in a memory or storage buffer 230 for use as look ahead metrics 231-234 in guiding the blend decision.

As seen from the foregoing, the total processing time at the modem layer 210 is $T_{MODEM}=T_{FE}+T_{DEMOD}$, where $T_{FE}=T_{SRC}+T_{ISO}+T_{FAC}+T_{SYM}$. Since the processing time for the front end module $T_{FE}$ is constant, there is a negligibly small difference between the time a signal sample is received at the antenna and the time that signal sample is presented to the demodulation module 217.

In the application layer 220, the audio and data signals from the demodulated baseband signal 219 are demultiplexed and audio transport decoding is performed. In particular, the demodulated baseband signal 219 is passed to the L2 data layer module 221 which performs Layer 2 data layer decoding during the data layer processing time $T_{L2}$. The time spent in L2 module 221 will be constant in terms of audio frames and will be dependent on the service mode and band. The L2-decoded signal is then passed to the IA audio decoding layer 222 which performs audio transport and decoding during the audio layer processing time $T_{L4}$. The time spent in L4 audio decoding module 222 will be constant in terms of audio frames and will be dependent on the service mode and band.

The L4-decoded signal is then passed to the quality adjustments module 223 which implements a quality adjustment algorithm during processing time $T_{QADJUST}$ for purposes of empowering the blend algorithm to lower the signal quality if the previously calculated signal quality measures indicate that the signal will be degrading. The time spent in quality adjustment module 223 will be constant in terms of audio frames and will be dependent on the service mode and band. As described herein, the quality adjustment algorithm may use previously-stored signal quality measures 231-234 retrieved 235 from the memory/storage buffer 230 as look ahead metrics when deciding whether to adjust the audio quality. For example, if the previously-stored signal quality measures 231-234 indicate that the upcoming audio samples are degraded or below a quality threshold measure, then the quality adjustment module 223 may adjust the audio quality by a fixed or variable amount based on signal metric. This is possible because the receiver system is deterministic in nature, so there is a defined constant time delay (in terms for audio frames) between the time when a sample reaches the demodulation module 217 and the time when the same sample is presented to the quality adjustments module 223. As a result, the calculated signal quality measure (e.g., CD/No) for a sample that is stored in the memory/storage buffer 230 during signal acquisition may be used to provide the quality adjustments module 223 with advanced or a priori knowledge of when the digital signal quality goes bad. By computing and storing the system delay for a given mode (e.g., FM—MP1-MP3, MP5, MP6, MP111 and AM—MA1, MA3), the signal quality measure CD/No value(s) 231-234 stored in the memory/storage buffer 230 may be used by the quality adjustments module 223 after the time delay required for the sample to reach the quality adjustments module 223. This is possible because the processing time delay ($T_{L2}+T_{L4}$) between the demodulation module 217 and quality adjustment module 223 means that the quality adjustment module 223 is processing older samples (e.g., CD/No(T−N)), but has access to "future" samples (e.g., CD/No(T), CD/No(T−1), CD/No(T−2), etc.) from the memory/storage buffer 230.

Subject to any L4 audio quality adjustments by the quality adjustments module 223, the blend algorithm module 224 processes the received signal during processing time $T_{BLEND}$ for purposes of deciding whether to stay in a digital or analog mode or to start digitally combining the analog audio frames with the realigned digital audio frames. The time spent in blend algorithm module 224 will be constant in terms of audio frames and will be dependent on the service mode and band. The blend algorithm module 224 decides whether to blend to digital or analog in response to a transition control signal from the quality adjustments module 223 for controlling the audio frame combination in terms of the relative amounts of the analog and digital portions of the signal that are used to form the output. As described hereinbelow, the selected blending algorithm output may be implemented by a separate audio transition module (not shown), subject to guidance control signaling provided by the blend decision module 225.

At the blend decision module 225, look ahead metrics extracted from the digital signal are processed to provide guidance control signaling to prevent unnecessary blending from analog to digital if the look ahead metrics for the digital signal are not good. In selected embodiments, the look ahead metrics are previously-computed signal quality measure CD/No value(s) 231-234 that are retrieved from the buffer 230. The blend decision module 225 processes the look ahead metrics during processing time $T_{DECISION}$ to decide whether the output of the blend algorithm (from blend algorithm module 224) will be used to combine the analog audio frames with the realigned digital audio frames based on signal strength of the digital signal in upcoming or "future" audio frames. The time $T_{BLEND}$ spent in blend decision module 225 will be constant in terms of audio frames and will be dependent on the service mode and band. As described herein, the blend decision module 225 may use previously-stored signal quality measures 235 retrieved from the memory/storage buffer 230 when deciding whether to implement the selected blend algorithm. In cases where the blending algorithm module 224 recommends a blending transition from analog to digital, the blend decision module 225 may issue a guidance control signal to prevent the transition to digital if the previously-stored digital signal quality measures (e.g., 231-234) indicate that the upcoming digital audio samples are degraded or below a quality threshold measure, in which case audio transition module (not shown) continues using the analog signal and refrains from blending back to digital as proposed by the blending algorithm module 224. In other cases where the blending algorithm module 224 recommends a blending transition from digital to analog, the blend decision module 225 may issue a guidance control signal to accelerate the transition to analog if the previously-stored digital signal quality measures (e.g., 231-234) indicate that the upcoming digital audio samples are degraded or below a quality threshold measure. For example, the blend decision module 225 may lower the quality of the signal going into the blend algorithm module 224, in which case audio transition module (not shown) switches to analog blend more quickly than would otherwise occur.

As disclosed herein, any desired evaluation algorithm may be used to evaluate the digital signal quality measures to determine the quality of the upcoming digital audio samples. For example, a signal quality threshold value (e.g., $Cd/No_{min}$) may define a minimum digital signal quality measure that must be met on a plurality of consecutive audio frames to allow blending from analog to digital. In addition or in the alternative, a threshold count may establish a trigger for preventing blending from analog to digital if the number of consecutive audio frames failing to meet the signal quality threshold value meets or exceeds the threshold count. In addition or in the alternative, a "running average" or "majority voting" quantitative decision may be applied to all digital signal quality measures stored in the buffer 230 to prevent blending from analog to digital if the digital signal quality measures in the buffer 230 do not meet the quantitative decision requirements.

The ability to use previously-computed signal quality measures exists because the receiver system is deterministic in nature, so there is a defined constant time delay (in terms of audio frames) between the time when a sample reaches the demodulation module 217 and the time when the blending decision is made at blend decision module 225. As a result, the calculated signal quality measure CD/No value for a sample that is stored in the memory/storage buffer 230 during signal acquisition may be used to provide the blend decision module 225 with advanced or a priori knowledge of when the digital signal quality goes bad. By computing and storing the system delay for a given mode (e.g., FM—MP1-MP3, MP5, MP6, MP11 and AM—MA1, MA3), the signal quality measure CD/No value(s) 231-234 stored in the memory/storage buffer 230 may be used by the blend decision module 225 after the time delay required for the sample to reach the blend decision module 225. This is possible because the processing time delay ($T_{L2}+T_{L4}+T_{QADJUST}+T_{BLEND}$) between the demodulation module 217 and blend decision module 225 means that the blend decision module 225 is processing older samples (e.g., CD/No(T−N)), but has access to "future" samples (e.g., CD/No(T), CD/No(T−1), CD/No(T−2), etc.) from the memory/storage buffer 230. In this way, the blend decision module 225 may prevent the receiver from repetitively blending back and forth between a low bandwidth audio signal (e.g., analog audio signal) to a high bandwidth audio signal (e.g. digital IBOC signal), thereby reducing unpleasant disruptions in the listening experience. In similar fashion, if the stored signal quality values (e.g., 231-234) indicate that the received digital signal is bad and will get worse, the blend decision module 225 may blend to analog quicker and/or stay in analog longer instead of listening to artifacts generated as the digital signal degrades. In this way, the stored signal quality values (e.g. 231-234) provide look ahead metrics to guide the blend decision with advance knowledge about the upcoming signal quality so that the blend algorithm can perform a better operation and provide a better user experience.

Figure 3:
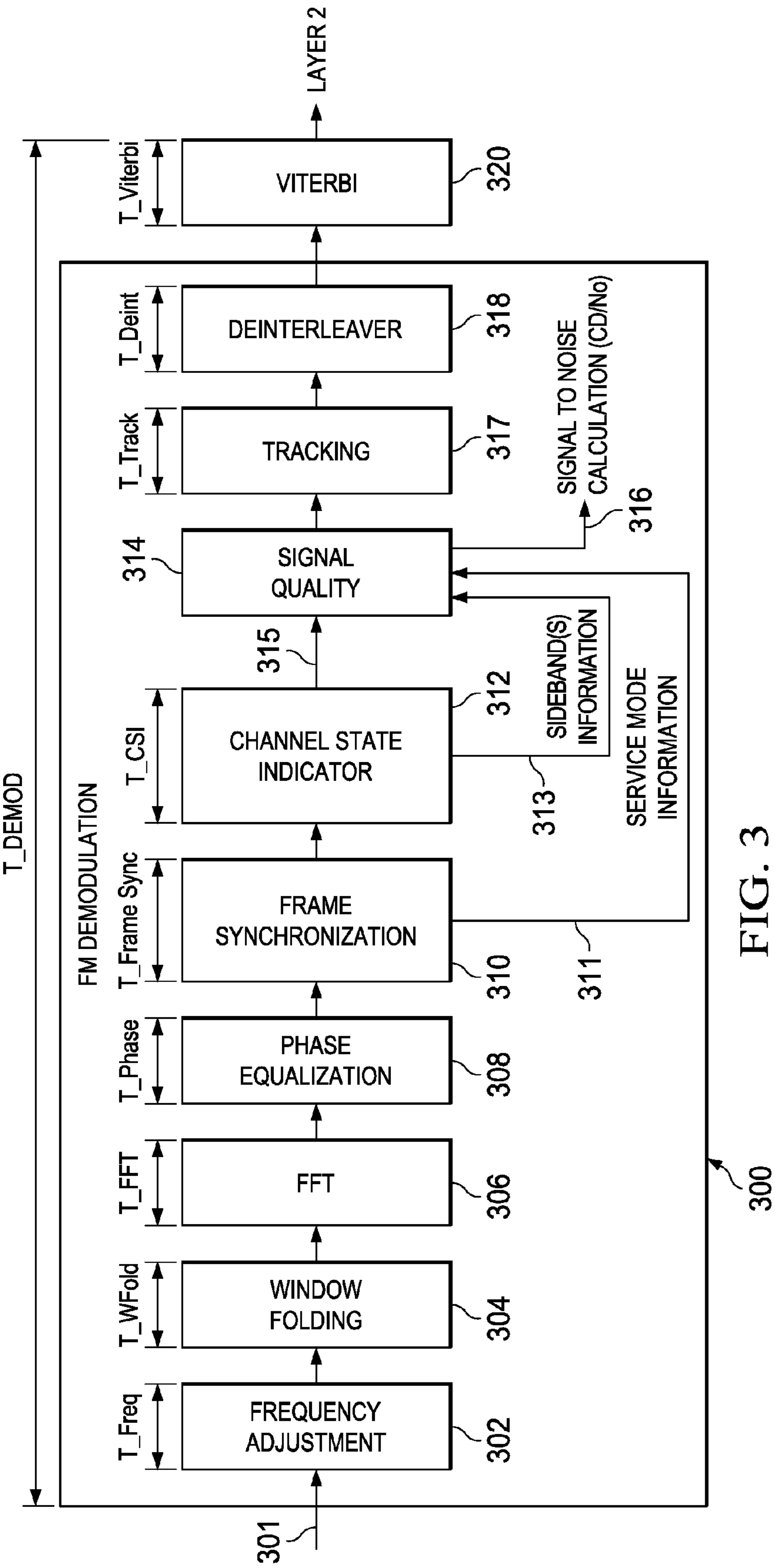
FIG. 3 illustrates a simplified timing block diagram of an exemplary FM demodulation module for calculating predetermined signal quality information for use in aligning and blending digital and analog audio FM signals in accordance with selected embodiments.

An exemplary FM demodulation module 300 is illustrated in FIG. 3 which shows a simplified timing block diagram of the FM demodulation module components for calculating predetermined signal quality information for use in aligning and blending digital and analog audio FM signals in accordance with selected embodiments. As illustrated, the received baseband signals 301 are processed by the frequency adjustment module 302 (over processing time $T_{Freq}$) to adjust the signal frequency. The resulting signal is processed by the window/folding module 304 (over processing time $T_{Wfold}$) to window and fold the appropriate symbol samples, and is then sequentially processed by the fast Fourier transform (FFT) module 306 (over processing time $T_{FFT}$), the phase equalization module 308 (over processing time $T_{Phase}$), and the frame synchronization module 310 (over processing time $T_{FrameSync}$) to transform, equalize and synchronize the signal for input to the channel state indicator module 312 for processing (over processing time $T_{CSI}$) to generate channel state information 315.

The channel state information 315 is processed by the signal quality module 314 along with service mode information 311 (provided by the frame synchronization module 310) and sideband information 313 (provided by the channel state indicator module 312) to calculate signal quality values 316 (e.g., SNR CD/No sample values) over time. In selected embodiments, each Cd/No value is calculated at the signal quality module 314 based on the signal-to-noise ratio (SNR) value of equalized upper and lower primary sidebands 313 provided by the CSI module 312. The SNR may be calculated by summing up $I^2$ and $Q^2$ from each individual upper and lower primary bins. Alternatively, the SNR may be calculated by separately computing SNR values from the upper sideband and lower sideband, respectively, and then selecting the stronger SNR value. In addition, the signal quality module 314 may use primary service mode information 311 extracted from system control data in frame synchronization module 310 to calculate different Cd/No values for different modes. For example, the CD/No sample values may be calculated as Cd/No_FM=10*log 10(SNR/360)/2+C, where the value of "C" depends on the mode. Based on the inputs, the signal quality module 314 generates channel state information output signal values for the symbol tracking module 317 where they are processed (over processing time $T_{Track}$) and then forwarded for deinterleaving at the deinterleaver module 318 (over processing time $T_{Deint}$) to produce soft decision bits. A Viterbi decoder 320 processes the soft decision bits to produce decoded program data units on the Layer 2 output line.

Figure 4:
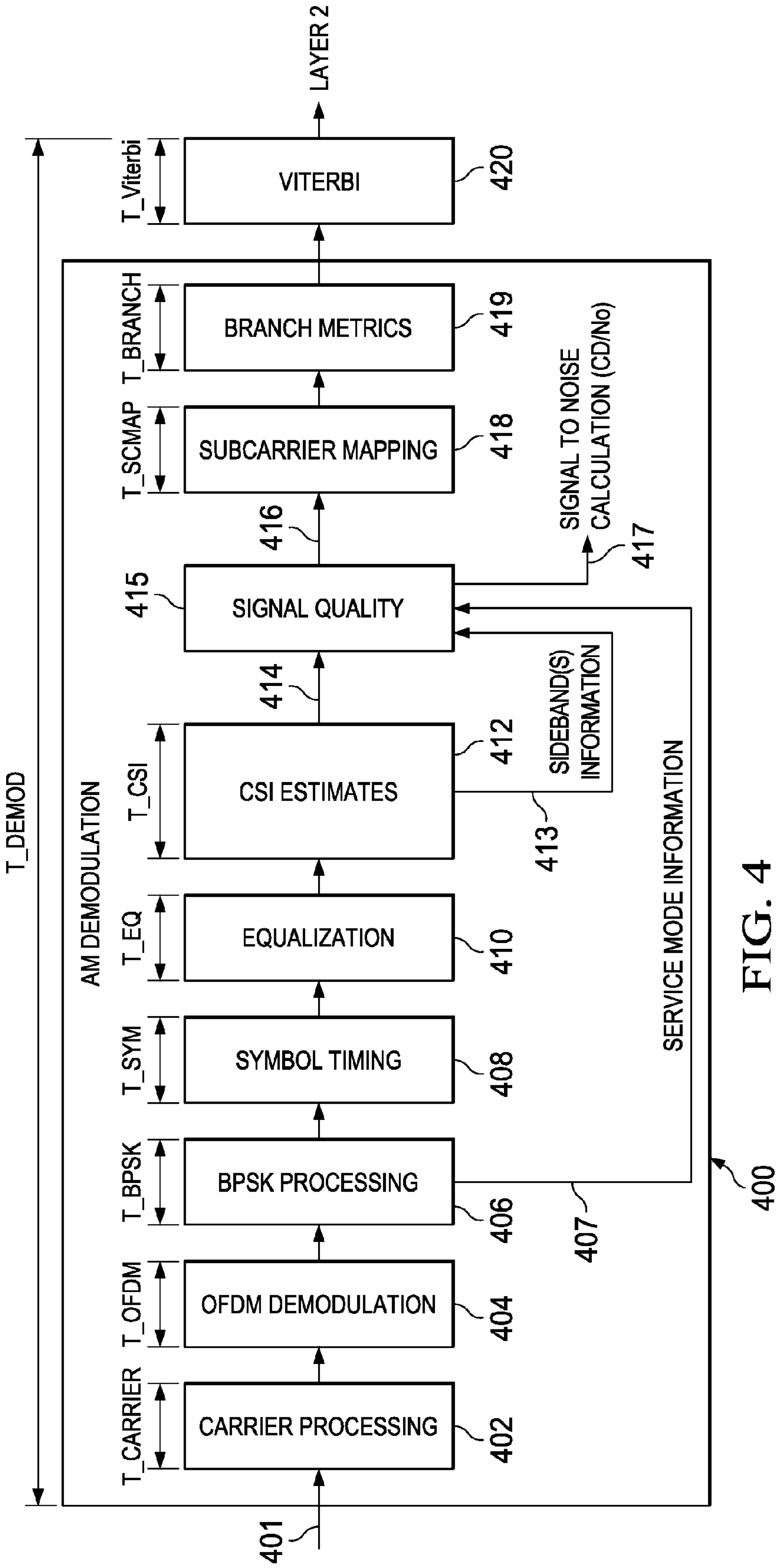
FIG. 4 illustrates a simplified timing block diagram of an exemplary AM demodulation module for calculating predetermined signal quality information for use in aligning and blending digital and analog audio AM signals in accordance with selected embodiments.

An exemplary AM demodulation module 400 is illustrated in FIG. 4 which shows a simplified timing block diagram of the AM demodulation module components for calculating predetermined signal quality information for use in aligning and blending digital and analog audio AM signals in accordance with selected embodiments. As illustrated, the received baseband signals 401 are processed by the carrier processing module 402 (over processing time $T_{Carrier}$) to generate a stream of time domain samples. The resulting signal is processed by the OFDM demodulation module 404 (over processing time $T_{OFDM}$) to produce frequency domain symbol vectors which are processed by the binary phase shift key (BPSK) processing module 406 (over processing time $T_{BPSK}$) to generate BPSK values. At the symbol timing module 408, the BPSK values are processed (over processing time $T_{SYM}$) to derive symbol timing error values. The equalizer module 410 processes the frequency domain symbol vectors in combination with the BPSK and carrier signals (over processing time $T_{EQ}$) to produce equalized signals for input to the channel state indicator estimator module 412 for processing (over processing time $T_{CSI}$) to generate channel state information 414.

The channel state information 414 is processed by the signal quality module 415 along with service mode information 407 (provided by the BPSK Processing module 406) and sideband information 413 (provided by the CSI estimator module 412) to calculate signal quality values 417 (e.g., SNR CD/No sample values) over time. In selected embodiments, each Cd/No value is calculated at the signal quality module 415 based on equalized upper and lower primary sidebands 413 provided by the CSI estimation module 412. The SNR may be calculated by summing up $I^2$ and $Q^2$ from each individual upper and lower primary bins. Alternatively, the SNR may be calculated by separately computing SNR values from the upper sideband and lower sideband, respectively, and then selecting the stronger SNR value. In addition, the signal quality module 415 may use the primary service mode information 407 which is extracted by the BPSK processing module 406 to calculate different Cd/No values for different modes. For example, the CD/No sample values may be calculated as Cd/No_AM=10*log 10((800/SNR)*4306.75)+C, where the value of "C" depends on the mode. The signal quality module 415 also generates CSI output signal values 416 for the subcarrier mapping module 418 where the signals are mapped (over processing time $T_{SCMAP}$) to subcarriers. The subcarrier signals are then processed by the branch metrics module 419 (over processing time $T_{BRANCH}$) to produce branch metrics that are forwarded to the Viterbi decoder 420 which processes the soft decision bits (over processing time $T_{Viterbi}$) to produce decoded program data units on the Layer 2 output line.

As indicated above, the demodulator module calculates predetermined signal quality information for every mode for storage and retrieval by the blending module to guide the blend decision. While any desired signal quality computation may be used, in selected embodiments, the signal quality information may be computed as a signal to noise ratio (CD/No) for use in guiding FM blending decisions using the equation Cd/No_FM=10*log 10(SNR/360)/2+C, where "SNR" is the SNR of equalized upper and lower primary sidebands 313 received from the CSI module 312, and where "C" has a specific value for each FM IBOC mode (e.g., C=51.4 for MP1, C=51.8 for MP2, C=52.2 for MP3, and C=52.9 for MP5, MP6, MP11). Similarly, the signal quality information may be computed as a signal to noise ratio (CD/No) for use in guiding AM blending decisions using the equation Cd/No_AM=10*log 10((800/SNR)*4306.75)+C, where "SNR" is the SNR of equalized upper and lower primary sidebands 413 received from the CSI estimation module 412, and where "C" has a specific value for each AM IBOC mode (e.g. C=30 for MA1 and C=15 for MA3). In other embodiments, the SNR may be calculated separately for the upper sideband and lower sidebands, followed by application of a selection method, such as selecting the stronger SNR value.

Figure 5:
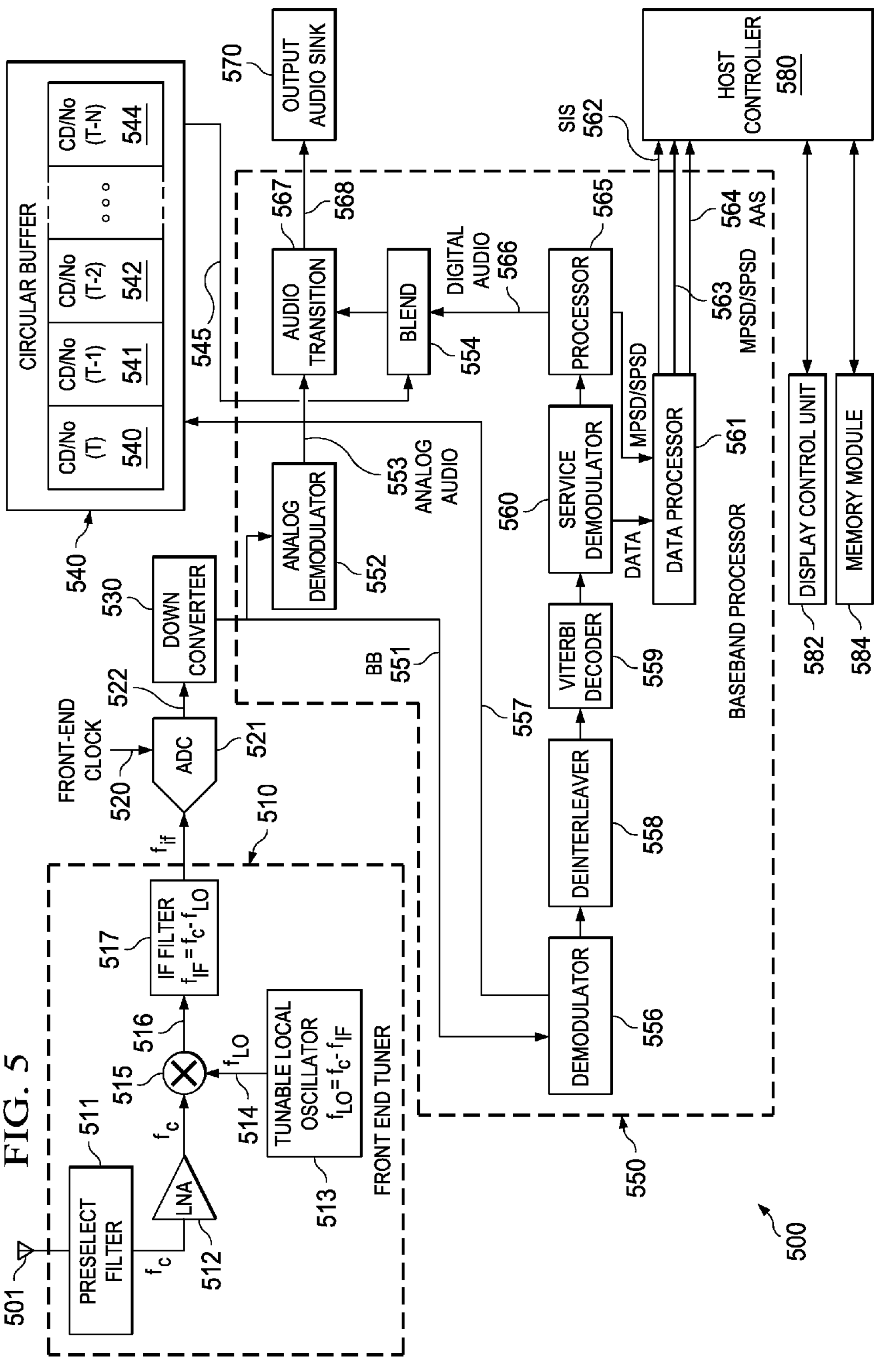
FIG. 5 illustrates a simplified block diagram of an exemplary digital radio broadcast receiver using predetermined signal quality information to prevent unnecessary blending back and forth between the analog and digital signals in accordance with selected embodiments.

To further illustrate selected embodiments of the present invention, reference is now made to FIG. 5 which illustrates a simplified block diagram of an exemplary IBOC digital radio broadcast receiver 500 (such as an AM or FM IBOC receiver) which uses predetermined signal quality information to prevent unnecessary blending back and forth between the analog and digital signals in accordance with selected embodiments. While only certain components of the receiver 500 are shown for exemplary purposes, it should be apparent that the receiver 500 may include additional or fewer components and may be distributed among a number of separate enclosures having tuners and front-ends, speakers, remote controls, various input/output devices, etc. In addition, many or all of the signal processing functions shown in the digital radio broadcast receiver 500 can be implemented using one or more integrated circuits.

The depicted receiver 500 includes an antenna 501 connected to a front-end tuner 510, where antenna 501 receives composite digital audio broadcast signals. In the front end tuner 510, a bandpass preselect filter 511 passes the frequency band of interest, including the desired signal at frequency $f_c$ while rejecting undesired image signals. Low noise amplifier (LNA) 512 amplifies the filtered signal, and the amplified signal is mixed in mixer 515 with a local oscillator signal $f_{lo}$ supplied on line 514 by a tunable local oscillator 513. This creates sum ($f_c+f_{lo}$) and difference ($f_c-f_{lo}$) signals on line 516. Intermediate frequency filter 517 passes the intermediate frequency signal $f_{if}$ and attenuates frequencies outside of the bandwidth of the modulated signal of interest. An analog-to-digital converter (ADC) 521 operates using the front-end clock 520 to produce digital samples on line 522. Digital down converter 530 frequency shifts, filters and decimates the signal to produce lower sample rate in-phase and quadrature baseband signals on lines 551, and may also output a receiver baseband sampling clock signal (not shown) to the baseband processor 550.

At the baseband processor 550, an analog demodulator 552 demodulates the analog modulated portion of the baseband signal 551 to produce an analog audio signal on line 553 for input to the audio transition module 567. In addition, a digital demodulator 556 demodulates the digitally modulated portion of the baseband signal 551. When implementing an AM demodulation function, the digital demodulator 556 directly processes the digitally modulated portion of the baseband signal 551. However, when implementing an FM demodulation function, the digitally modulated portion of the baseband signal 551 is first filtered by an isolation filter (not shown) and then suppressed by a first adjacent canceller (not shown) before being presented to the OFDM digital demodulator 556. In either the AM or FM demodulator embodiments, the digital demodulator 556 periodically determines and stores a signal quality measure 557 in a circular or ring storage buffer 540 for use in guiding the blend decision performed at blend module 554. The signal quality measure may be computed as signal to noise ratio values (CD/No) for each IBOC mode (MP1-MP3, MP5, MP6, MP11, MA1 and MA3) so that a first CD/No value at time (T−N) is stored at 544, and future CD/No values at time (T−2), (T−1) and (T) are subsequently stored at 543, 542, 541 in the circular buffer 540.

After processing at the digital demodulator 556, the digital signal is deinterleaved by a deinterleaver 558, and decoded by a Viterbi decoder 559. A service demodulator 560 separates main and supplemental program signals from data signals. A processor 565 processes the program signals to produce a digital audio signal on line 566. At the blend module 554, the digital audio signal 566 and one or more previously-computed signal quality measure CD/No value(s) 541-544 retrieved 545 from the circular buffer 540 are processed to generate and control a blend algorithm for blending the analog and main digital audio signals in the audio transition module 567. For example, if the previously-stored digital signal quality measures 541-544 indicate that the upcoming audio samples are degraded or below a quality threshold measure, then the blend module 554 may generate a blend algorithm which uses the analog signal and refrains from blending back to digital since the signal quality values stored in the memory/storage buffer 540 provide the blend module 554 with advanced or a priori knowledge of when the digital signal quality goes bad. In similar fashion, if the stored digital signal quality values (e.g., 541-544) indicate that the received digital signal is bad and will get worse, the blend module 554 may blend to analog and stay in analog longer instead of listening to artifacts generated as the digital signal degrades. In other embodiments, a supplemental digital audio signal is passed through the blend module 554 and audio transition module 567 to produce an audio output on line 568.

A data processor 561 processes the data signals from the service demodulator 560 to produce data output signals on data lines 562-564 which may be multiplexed together onto a suitable bus such as an inter-integrated circuit ($I^2C$), serial peripheral interface (SPI), universal asynchronous receiver/transmitter (UART), or universal serial bus (USB). The data signals can include, for example, SIS signal 562. MPS or SPS data signal 563, and one or more AAS signals 564.

The host controller 580 receives and processes the data signals 562-564 (e.g., the SIS, MPSD, SPSD, and AAS signals) with a microcontroller or other processing functionality that is coupled to the display control unit (DCU) 582 and memory module 584. Any suitable microcontroller could be used such as an Atmel® AVR 8-bit reduced instruction set computer (RISC) microcontroller, an advanced RISC machine (ARM®) 32-bit microcontroller or any other suitable microcontroller. Additionally, a portion or all of the functions of the host controller 580 could be performed in a baseband processor (e.g. the processor 565 and/or data processor 561). The DCU 582 comprises any suitable I/O processor that controls the display, which may be any suitable visual display such as an LCD or LED display. In certain embodiments, the DCU 582 may also control user input components via touch-screen display. In certain embodiments the host controller 580 may also control user input from a keyboard, dials, knobs or other suitable inputs. The memory module 584 may include any suitable data storage medium such as RAM, Flash ROM (e.g., an SD memory card), and/or a hard disk drive. In certain embodiments, the memory module 584 may be included in an external component that communicates with the host controller 580, such as a remote control.

Figure 6:
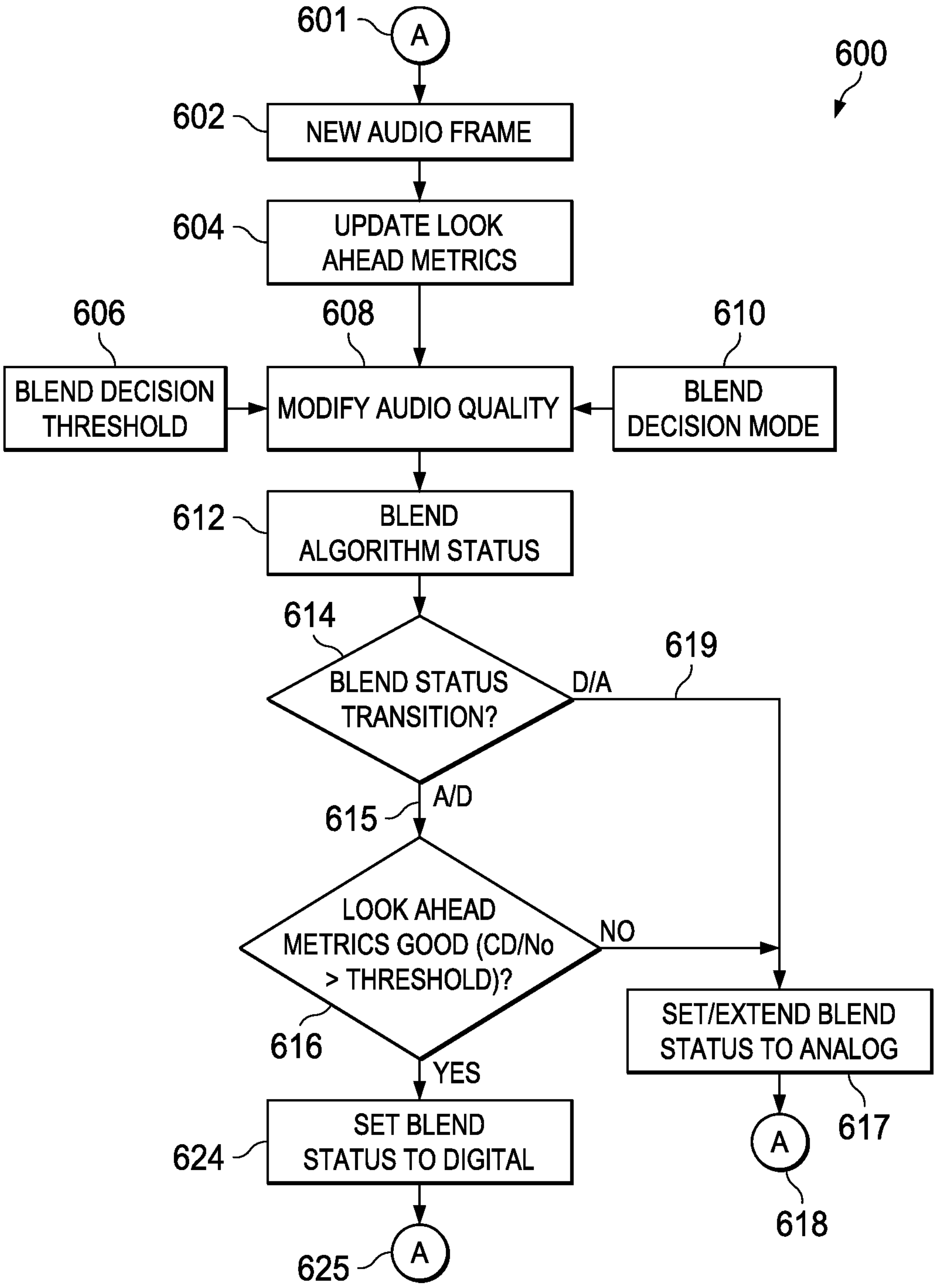
FIG. 6 illustrates a first exemplary process for blending audio samples of a digital portion of a radio broadcast signal with audio samples of an analog portion of the radio broadcast signal based on look ahead metrics which provide advance knowledge about the upcoming digital signal quality.

To further illustrate selected embodiments, reference is now made to FIG. 6 which illustrates a first exemplary process 600 for blending audio samples of a digital portion of a radio broadcast signal with audio samples of an analog portion of the radio broadcast signal based on look ahead metrics which provide advance knowledge about the upcoming digital signal quality. After the process starts at step 601, a new audio frame is received and demodulated at the receiver (step 602). As the frame is demodulated, signal quality information is extracted to determine the digital signal quality for use as a look ahead metric. For example, the digital signal quality for the frame may be computed as a signal to noise ratio value (CD/No) for each IBOC mode (e.g., MP1-MP3, MP5, MP6, MP11, MA1 and MA3), and then stored in memory (e.g., a ring buffer), thereby updating the look ahead metrics (step 604). As will be appreciated, additional IBOC modes can be added in the future.

At step 608, upper layer audio decoding (e.g., L4 audio quality decoding) is applied to the received audio frame. At this point, the audio decoding may be modified with one or more blend decision threshold inputs (step 606) specifying the digital signal quality threshold value required for the look ahead metrics when evaluating the digital signal quality. In selected embodiments, different blend decision threshold inputs may be provided for each service mode. The audio decoding may also be modified with inputs specifying one or more blend decision modes for the decoding process (step 610). In a first "analog-to-digital look ahead" mode, blending from analog to digital also takes into account the look ahead metrics (e.g., previously computed CD/No values) to delay blending from analog to digital based when one or more previously-computed audio frame CD/No values are lower than a specified blend decision threshold. In a second "bidirectional look ahead" mode, look ahead metrics are taken into account (along with QI, blend threshold, and blend rate parameters) when blending from analog to digital (to delay blending to digital if the look ahead metrics do not look good) and when blending from digital to analog (to accelerate blending to analog if the look ahead metrics do not look good).

In an example embodiment for the "bidirectional look ahead" mode, the audio quality may be modified at step 608 when the blend decision mode 610 changes from "digital" to "analog" based on an evaluation of the look ahead metrics. When a digital-to-analog transition occurs, previously-computed look ahead metric values may be evaluated to determine if the digital signal quality of upcoming audio frames is good. The evaluation step may compare previously-computed Cd/No values with a threshold value using any desired quantitative decision comparison technique. If the look ahead metrics for the upcoming audio frames look good, the blend status is set to "analog" at step 608. However, if the look ahead metrics for the upcoming audio frames do not look good, the transition of the blend status to analog is accelerated at the audio quality modification step 608. The accelerated change in blend status may be implemented by reducing the digital audio quality indicator (QI) parameter input described hereinabove. By reducing the signal quality input, the blend algorithm effectively accelerates the blend from digital to analog in response to indications from the look ahead metrics that the digital signal quality is degrading.

At step 612, the blend algorithm processes the received audio frame to select a blend status for use in digitally combining the analog portion and digital portion of the audio frame. The selected blend status is used by the audio transition process (not shown) which performs audio frame combination by blending relative amounts of the analog and digital portions to form the audio output. To this end, the blend algorithm may propose an "analog" blend status or a "digital" blend status so that, depending on the current blend status, an "analog to digital" or "digital to analog" transition results. As will be appreciated, a proposal to blend to "analog" will cause the signal to blend to mute with any all-digital IBOC modes (e.g., such as MP5, MP6 and MA3) or selected supplemental program services (SPS) or main program service (MPS) modes which have no analog backup.

At step 614, any transition in the blend status is detected. If a digital-to-analog transition 619 is detected, the blend status is set to analog at step 617 and the process returns 618 to process the next audio frame 601. However, if an analog-to-digital transition 615 is detected, one or more previously-computed look ahead metrics are evaluated at step 616 to determine if the digital signal quality of upcoming audio frames is good. The evaluation step 616 may retrieve previously-computed Cd/No values on consecutive audio frames from memory and compare them with a threshold value. As will be appreciated, any other desired quantitative decision comparison algorithm may be used at step 616. As will be appreciated, the evaluation decision 616 is used in both the "analog-to-digital look ahead" mode and the "bidirectional look ahead" mode.

If the look ahead metrics for the upcoming audio frames do not look good (negative outcome to decision 616), the blend status is extended to analog at step 617 and the process returns 618 to process the next audio frame 601. By setting the blend status to analog after detecting an "analog-to-digital" transition 615, the blend decision effectively delays the normal blend from analog to digital proposed by the blend algorithm step 612. On the other hand, if the look ahead metrics for the upcoming audio frames look good (affirmative outcome to decision 616), the blend status is set to digital at step 624 and the process returns 625 to process the next audio frame 601.

Figure 7A:
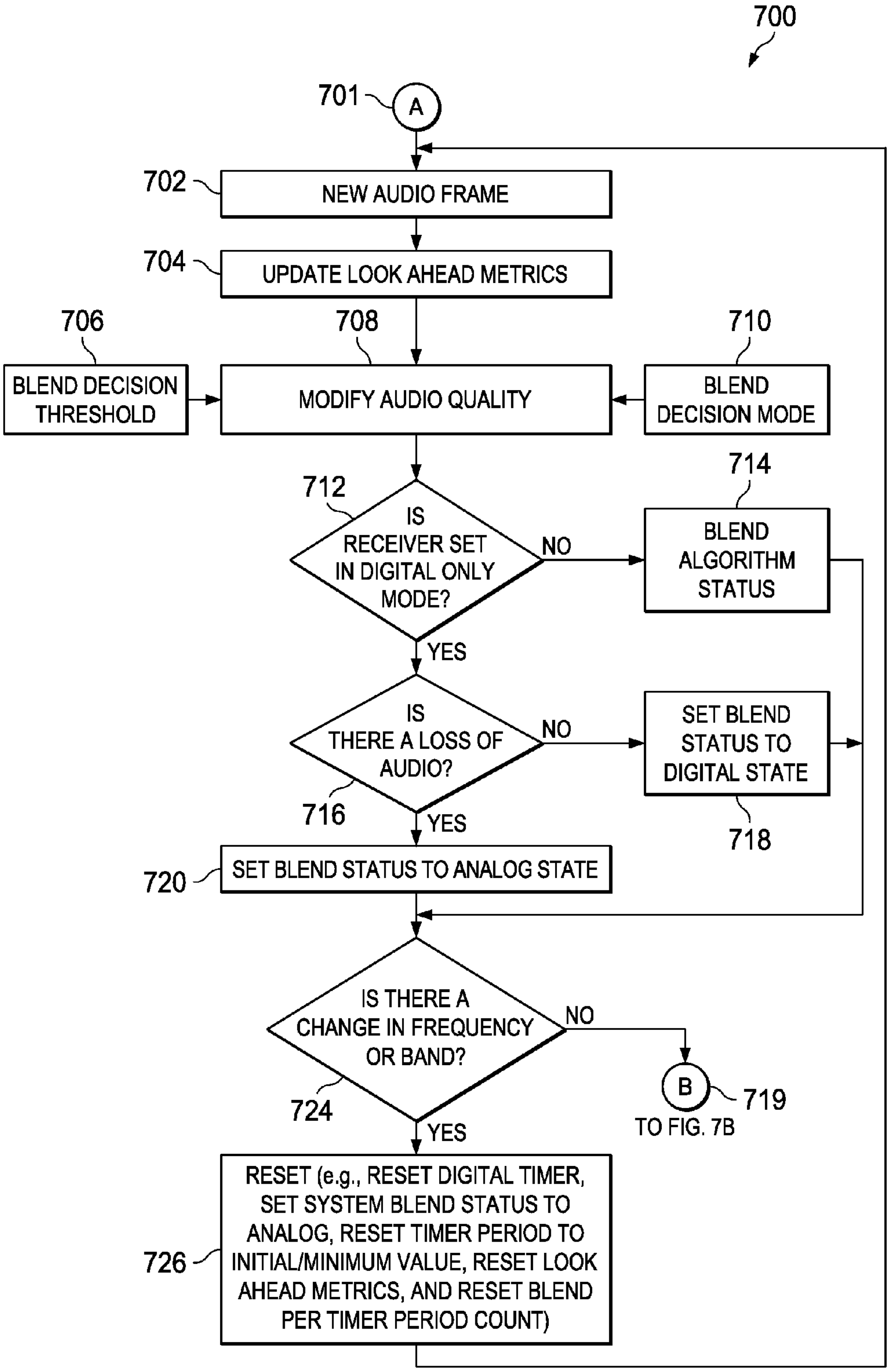
FIGS. 7*a-c* illustrate a second exemplary process for blending audio samples of a digital portion of a radio broadcast signal with audio samples of an analog portion of the radio broadcast signal based on look ahead metrics which provide advance knowledge about the upcoming digital signal quality.
Figure 7B:
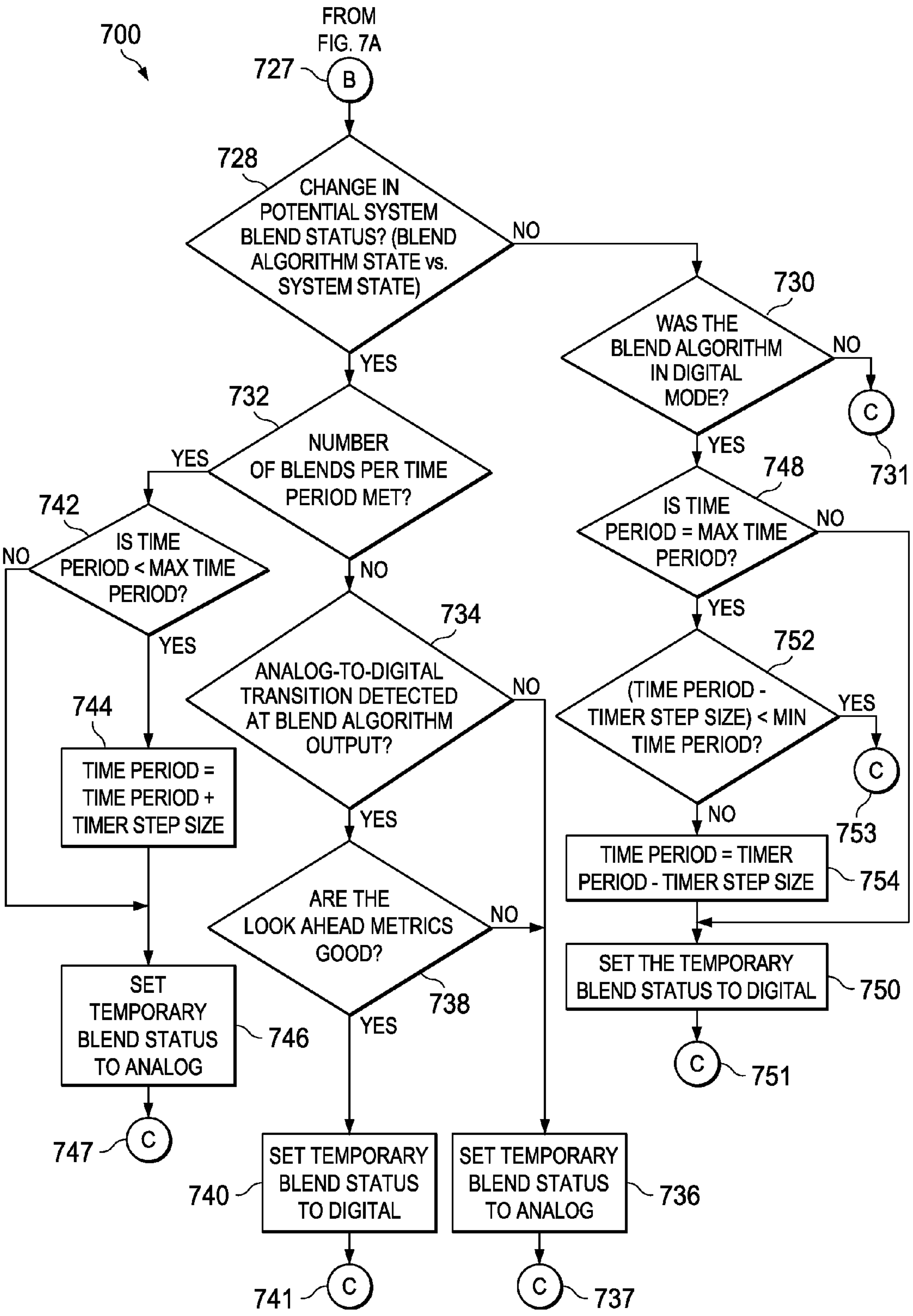
Figure 7C:
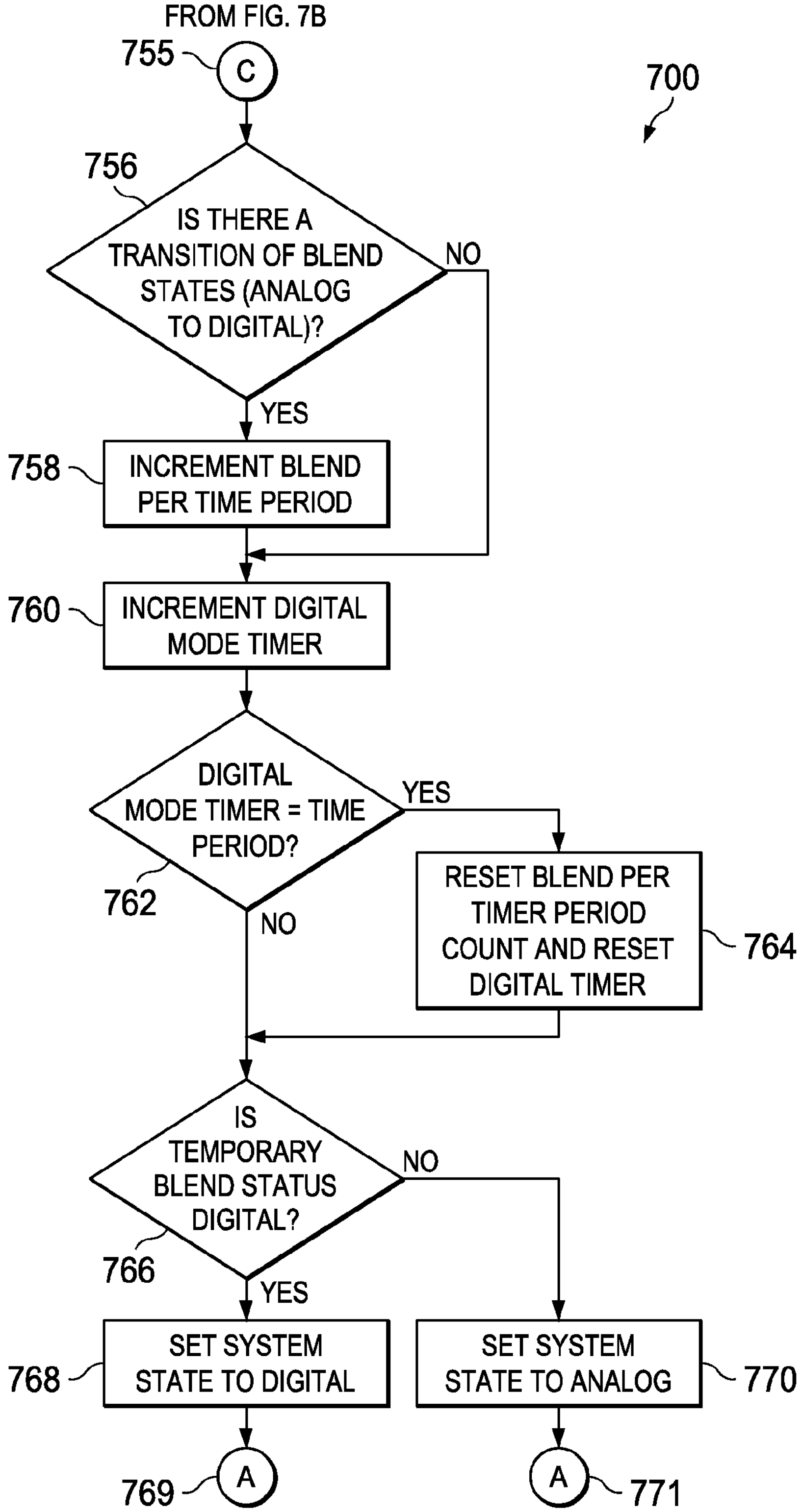

FIGS. 7*a-c* illustrate a second exemplary process 700 for blending analog and digital audio portions of a radio broadcast signal based on the number of blend transitions in a given timer period and one or more look ahead metrics which provide advance knowledge about the upcoming digital signal quality. In general terms, the process 700 includes a retune process (FIG. 7*a*), a blend decision process which uses look ahead metrics and running blend count (FIG. 7*b*), and a system state setting process (FIG. 7*c*). After the process starts at step 701, a new audio frame is received and demodulated at the receiver (step 702). As the frame is demodulated, predetermined signal quality information is extracted to determine the digital signal quality for use as a look ahead metric. For example, the digital signal quality for the frame may be computed as a signal to noise ratio value (CD/No) for each IBOC mode (MP1-MP3, MP5, MP6, MP11, MA1 and MA3), and then stored in memory (e.g., a ring buffer), thereby updating the look ahead metrics (step 704).

At step 708, upper layer audio decoding (e.g., L4A audio quality decoding) is applied to the received audio frame, subject to modification by input from one or more blend decision threshold inputs (step 706) which specify the digital signal quality threshold value required for the look ahead metrics when evaluating the digital signal quality under one or more service modes. The audio decoding may also be modified with inputs specifying one or more blend decision modes for the decoding process (step 710), such as an "analog-to-digital look ahead" mode and/or a "bidirectional look ahead" mode. As described herein, previously-computed look ahead metrics are used along with QI, blend threshold, and blend rate parameters when determining whether to blend from analog to digital (to delay blending to digital if the look ahead metrics do not look good) and when blending from digital to analog (to accelerate blending to analog if the look ahead metrics do not look good).

At step 712, the process determines if the receiver is configured in a digital only mode to play in digital mode without analog blending. The determination may be made by reading a predetermined receiver setting (e.g., blend threshold parameter) to see if a digital-only mode is set. If the receiver is not configured in a digital only mode (negative outcome to decision 712), the received audio frame is processed by the blend algorithm at step 714 to output a blend status for use in digitally combining the analog portion and digital portion of the audio frame, after which the retune process proceeds to step 724 to detect whether there is any change in the receiver's selected frequency or band. On the other hand, if the receiver is configured in a digital only mode (affirmative outcome to decision 712) and there is no loss of audio (negative outcome to detection step 716), the receiver sets the blend status to a digital state (step 718) and the process proceeds to step 724 to detect whether there is any change in the receiver's selected frequency or band. But if there is a loss of audio (affirmative outcome to detection step 716), the receiver sets the blend status to an analog state (step 720) and then detects whether there is any change in the receiver's selected frequency or band (step 724). As will be appreciated, setting the blend status to "analog" will cause the signal to blend to mute with any all-digital IBOC modes (e.g., such as MP5, MP6 and MA3) or selected supplemental program services (SPS) or main program services (MPS) which have no analog backup.

If a frequency or band change is detected (affirmative outcome to detection step 724), the receiver resets predetermined digital status parameters at step 726. In selected example embodiments, the reset function causes the digital timer to be reset and the system blend status is set to "analog." In addition, the timer period is reset to an initial or minimum value in the event of a frequency/band change. The look ahead metrics may also be reset in the event of a frequency/band change, such as by flushing the contents of the ring buffer memory. Finally, a "blend/timer period" count may be reset in the event of a frequency/band change. After reset 726, the process returns 701 to process the next audio frame 702. If there is no frequency/band change (negative outcome to detection step 724), the proceeds 719 to start the blend decision process 727.

Referring now to FIG. 7*b*, the blend decision process begins be detecting if there is a potential change in the system blend status at step 728. The determination may be made by comparing the blend algorithm status with the system state for a given system mode to detect possible changes from "digital" to "analog" or vice versa. If there is a potential blend status change detected (affirmative outcome to detection step 728), the receiver uses a running blend count and one or more look ahead metrics to guide the blend transition process into the analog mode if the digital signal quality has been excessively degraded (as indicated by the running blend count) or will be excessively degraded (as indicated by the look ahead metric(s)). To use the running blend count to guide the blending process, the receiver tracks the number of blends (e.g., transitions from analog to digital) that occur in a given time period, and if the number of blends in the time period meets or exceeds a maximum amount, the blend status is set to "analog" until the receiver recovers and the digital signal quality improves. In this aspect, an excessive number of blend transitions occurring in a defined time period is an indication that the digital signal quality is poor, and that the system should be confined to the analog mode. In an example implementation, the receiver tracks the number of blends at step 732. If the detected number of blends does not meet a specified limit (negative outcome to detection step 732), the receiver proceeds to step 734 to begin evaluating the received signal against look ahead metrics. However, if the detected number of blends meets or exceeds a specified limit (affirmative outcome to detection step 732), the receiver determines if an associated time period requirement has been met, or otherwise increments the associated timer. In particular, the receiver determines if the current time period value is less than a maximum time period value (step 742). If not (negative outcome to decision step 742), the time period requirement for the running blend count is met, and the temporary blend status is set to "analog" at step 746 before the process proceeds 747 to start the system state setting process 755. However, if the maximum time period value has not been reached (affirmative outcome to decision step 742), the running blend count requirement is not met. At this point, the time period may be incremented by a defined timer step size at step 744, and the receiver may now proceed to set the temporary blend status to "analog" at step 746.

At step 734, any analog-to-digital transition in the blend status is detected. If no analog-to-digital transition is detected (negative outcome to decision 734), the temporary blend status is set to "analog" at step 736 before the process proceeds 737 to start the system state setting process 755. However, if an analog-to-digital transition is detected (affirmative outcome to decision 734), one or more previously-computed look ahead metrics are evaluated at step 738 to determine if the digital signal quality of upcoming audio frames is good. The evaluation step 738 may retrieve previously-computed Cd/No values on consecutive audio frames from memory and compare them with a threshold value, though any desired quantitative decision comparison algorithm may be used.

If the look ahead metrics for the upcoming audio frames do not look good (negative outcome to decision 738), the temporary blend status is set to "analog" at step 736 and the process proceeds 737 to start the system state setting process 755. By setting the blend status to "analog" after detecting an "analog-to-digital" transition 734 in response to poor look ahead metrics, the blend decision effectively delays the normal blend from analog to digital. On the other hand, if the look ahead metrics for the upcoming audio frames look good (affirmative outcome to decision 738), the temporary blend status is set to "digital" at step 740 and the process proceeds 741 to start the system state setting process 755.

Referring back to the blend status transition detection step 728, if there is no potential change in the system blend status (negative outcome to detection step 728), the receiver detects if the blend algorithm is in digital mode at step 730. If not (negative outcome to detection step 730), the blend algorithm is in analog mode, and the process proceeds 731 to the blend count limit process 755. However, if the blend algorithm is in digital mode (affirmative outcome to detection step 730) and the maximum time period is not reached (negative outcome to decision 748), the temporary blend status is set to "digital" at step 750 before proceeding 751 to the blend count limit process 755. On the other hand, if the maximum time period is reached (affirmative outcome to decision 748, the receiver decrements the time period for so long as the timer is within a defined range of values. For example, if the time period is equal to a maximum time period (affirmative outcome to decision 748) but greater than a minimum time period by a specified timer step size (negative outcome to decision 752), the time period is decremented by the specified timer step size at step 754 and the temporary blend status is set to "digital" at step 750 before proceeding 751 to start the system state setting process 755. Otherwise, (affirmative outcome to decision 752), the process proceeds 753 to start the system state setting process 755.

Referring now to FIG. 7*c*, the system state setting process begins by detecting any transition of blend states (e.g., from analog to digital) at step 756. If there is a blend state transition (affirmative outcome to detection step 756), the "blend/timer period" count is incremented at step 758 and the digital time mode timer is incremented at step 760. Alternatively, if there no blend state transition (negative outcome to detection step 756), the "blend/timer period" count is not incremented, but the digital time mode timer is incremented at step 760.

If the incremented digital mode timer is equal to the time period (affirmative outcome to detection step 762), the "blend/timer period" count and digital timer are reset at step 764. Otherwise (negative outcome to detection step 762), the receiver determines whether the temporary blend status has been set to "digital" at step 766. At this stage, any "digital" temporary blend status was set at step 740 (in response to favorable look ahead metrics) or step 750 (in cases where the blend algorithm is originally set in digital mode. Similarly, any "analog" temporary blend status was set at step 736 (in response to unfavorable look ahead metrics). Thus, detection of a "digital" temporary blend status (affirmative outcome to decision 766) causes the system state to be set to "digital" at step 768 before the process returns 769 to process the next audio frame 701.

On the other hand, any detected "analog" temporary blend status (negative outcome to decision 766) causes the system state to be set to "analog" at step 770 before the process returns 771 to process the next audio frame 701. Depending on the service mode, the resulting behavior of the "analog" system state may change. For example, selected main program services (MPS) modes, such as MP1, MP2, MP3, MP11, MA1, are hybrid modes which have a backup analog signal. In these modes, if the lookup metrics indicate that the IBOC digital signal goes away for any reason (e.g. lack of signal, interference, etc.), the signal will blend to analog. However, in all-digital IBOC modes (e.g., such as MP5, MP6 and MA3), there is no analog backup, so if the IBOC digital signal goes away, the signal will blend to mute. In similar fashion, selected supplemental program services (SPS) modes function effectively as hidden channels with no analog backup, so if the IBOC digital signal goes away, the signal will blend to mute.

As will be appreciated, the disclosed method and receiver apparatus for processing a composite digital audio broadcast signal and programmed functionality disclosed herein may be embodied in hardware, processing circuitry, software (including but is not limited to firmware, resident software, microcode, etc.), or in some combination thereof, including a computer program product accessible from a computer-usable or computer-readable medium providing program code, executable instructions, and/or data for use by or in connection with a computer or any instruction execution system, where a computer-usable or computer readable medium can be any apparatus that may include or store the program for use by or in connection with the instruction execution system, apparatus, or device. Examples of a non-transitory computer-readable medium include a semiconductor or solid state memory, magnetic tape, memory card, a removable computer diskette, a random access memory (RAM), a read-only memory (ROM), a rigid magnetic disk and an optical disk, such as a compact disk-read only memory (CD-ROM), compact disk-read/write (CD-R/W) and DVD, or any other suitable memory.

By now it should be appreciated that there is provided herein a receiver for an in-band on-channel broadcast signal and associated method of operation for processing a composite digital audio broadcast signal. As disclosed, a received composite digital audio broadcast signal is separated into an analog audio portion and a digital audio portion. In a modem front end, the digital audio portion of the composite digital audio broadcast signal is processed to compute a plurality of signal quality metric values. In selected embodiments, the signal quality metric values are periodically computed from the digital audio portion at each audio frame, and then stored in a storage buffer for subsequent retrieval during blending of the analog audio signal with the digital audio signal. In selected embodiments, signal quality metric values may be computed for each of a plurality of supported service modes.

In addition, a delay measure may be computed which specifies the delay between processing the digital audio portion of the composite digital audio broadcast signal and blending the analog audio signal with the digital audio signal. When embodied in an FM demodulator, each of the signal quality metric values may be computed as FM signal quality metric values when the composite digital radio broadcast signal is received on an FM analog modulated carrier signal using a signal-to-noise ratio (SNR) computed from upper and lower primary sidebands provided by a channel state information module such that each signal quality metric value is computed as 10*log 10(SNR/360)/2+C, where C is an adjustment term for each supported service mode. When embodied in an AM demodulator, each of the signal quality metric values may be computed as AM signal quality metric values when the composite digital radio broadcast signal is received on an AM analog modulated carrier signal using a signal-to-noise ratio (SNR) computed from upper and lower primary sidebands provided by a BPSK module such that each signal quality metric value is computed as 10*log 10((800/SNR)*4306.75)+C, where C is an adjustment term for each supported service mode. In addition, the analog and digital audio portions of the composite digital audio broadcast signal are demodulated to produce an analog audio signal and a digital audio signal, respectively. The analog audio signal is blended with the digital audio signal to produce an audio output by preventing or delaying blending from analog to digital when one or more previously computed signal quality metric values do not meet a signal quality threshold requirement. In addition, the analog audio signal may be blended with the digital audio signal by accelerating a blending from digital to analog when one or more previously computed signal quality metric values do not meet a signal quality threshold requirement. In any case, the decision to accelerate or prevent blending may be implemented with computer program instructions which are adapted to determine when a plurality of consecutive audio frames failing to meet the signal quality threshold requirement meets or exceeds the threshold count, or when a computed running average computed from the previously computed signal quality metric values is below a predetermined signal quality threshold requirement, or when a majority of the previously computed signal quality metric values is below a predetermined signal quality threshold requirement. In addition to using the signal quality metric values, a running count of how many blend transitions occur within a timer period may be computed to prevent or blending from analog to digital when the running count meets a count threshold.

Although the described exemplary embodiments disclosed herein are directed to an exemplary IBOC system for blending analog and digital signals using digital signal quality look ahead metrics, the present invention is not necessarily limited to the example embodiments which illustrate inventive aspects of the present invention that are applicable to a wide variety of digital radio broadcast receiver designs and/or operations. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A method for processing a composite digital audio broadcast signal, comprising:

separating a composite digital audio broadcast signal into an analog audio portion and a digital audio portion;

demodulating the analog and digital audio portions of the composite digital audio broadcast signal to produce an analog audio signal and a digital audio signal, respectively, where demodulating the digital audio portion comprises processing the digital audio portion of the composite digital audio broadcast signal to compute a plurality of signal quality metric values from a corresponding plurality of audio frames; and controlling audio frame combination of the analog audio signal and the digital audio signal used to produce an audio output by preventing or delaying blending from analog to digital when one or more look ahead signal quality metric values computed from previously received audio frames do not meet a signal quality threshold requirement.

2. The method of claim 1, where processing the digital audio portion of the composite digital audio broadcast signal comprises periodically computing a signal quality metric value from digital audio portions at different audio frames.

3. The method of claim 1, further comprising storing the plurality of signal quality metric values in a storage buffer for subsequent retrieval during blending of the analog audio signal with the digital audio signal.

4. The method of claim 1, where each of the plurality of signal quality metric values is computed in an FM demodulator based on a signal-to-noise ratio (SNR) computed from upper and lower primary sidebands provided by a channel state information module.

5. The method of claim 4, where each signal quality metric value is computed as 10*log 10(SNR/360)/2+C, where C is an adjustment term for each supported service mode.

6. The method of claim 1, where each of the plurality of signal quality metric values is computed in an AM demodulator based on a signal-to-noise ratio (SNR) computed from upper and lower primary sidebands provided by a binary phase shift key module.

7. The method of claim 6, where each signal quality metric value is computed as 10*log 10((800/SNR)*4306.75)+C, where C is an adjustment term for each supported service mode.

8. The method of claim 1, where processing the digital audio portion of the composite digital audio broadcast comprises computing a plurality of signal quality metric values for each of a plurality of supported service modes.

9. The method of claim 1, further comprising computing for one or more supported service modes a delay measure specifying the delay between processing the digital audio portion of the composite digital audio broadcast signal and blending the analog audio signal with the digital audio signal.

10. The method of claim 1, further comprising blending the analog audio signal with the digital audio signal by accelerating a blending from digital to analog when one or more previously computed signal quality metric values do not meet a signal quality threshold requirement.

11. The method of claim 1, further comprising:

computing a running count of how many blend transitions occur within a timer period; and blending the analog audio signal with the digital audio signal by preventing or delaying blending from analog to digital when the running count meets a count threshold.

12. A receiver for an in-band on-channel broadcast signal comprising at least one non-transitory recordable storage medium having stored thereon executable instructions and data which, when executed by at least one processing device, cause the at least one processing device to blend analog and digital audio portions of the composite digital radio broadcast signal by:

demodulating the analog and digital audio portions of the composite digital radio broadcast signal to produce an analog audio signal and a digital audio signal, respectively, where demodulating the digital audio portion comprises:

processing audio samples of the digital audio portion of the composite digital radio broadcast signal to compute signal quality metric values for a plurality of audio frames, and storing the signal quality metric values in memory; and controlling audio frame combination of the analog audio signal and the digital audio signal used to produce an audio output by preventing blending from analog to digital when one or more look ahead signal quality metric values stored in memory do not meet a signal quality threshold requirement.

13. The receiver of claim 12, further comprising executable instructions and data which cause the at least one processing device to blend analog and digital audio portions of the composite digital radio broadcast signal by:

computing a running count of blend transitions occurring within a timer period; and blending the analog audio signal with the digital audio signal by preventing blending from analog to digital when the running count meets a count threshold.

14. The receiver of claim 12, further comprising executable instructions and data which cause the at least one processing device to blend analog and digital audio portions of the composite digital radio broadcast signal by:

blending the analog audio signal with the digital audio signal by accelerating a blending from digital to analog when one or more signal quality metric values stored in memory do not meet a signal quality threshold requirement.

15. A tangible non-transitory computer readable medium comprising computer program instructions adapted to cause one or more processors to:

demodulate the analog and digital audio portions of a current audio sample of the composite digital radio broadcast signal to produce an analog audio signal and a digital audio signal, respectively, where a plurality of audio samples of the digital audio portion of the composite digital radio broadcast signal are processed to compute a plurality of signal quality metric values; and control audio frame combination of the analog audio signal and the digital audio signal of the current audio sample used to produce an audio output by preventing blending from analog to digital when one or more previously computed signal quality metric values from previously received audio samples do not meet a signal quality threshold requirement.

16. The computer readable storage medium of claim 15, further comprising computer program instructions adapted to cause the one or more processors to:

compute a running count of blend transitions occurring within a timer period; and blend the analog audio signal with the digital audio signal by preventing blending from analog to digital when the running count meets a count threshold.

17. The computer readable storage medium of claim 15, further comprising computer program instructions adapted to cause one or more processors to:

blend the analog audio signal and the digital audio signal of the current audio sample by accelerating a blending from digital to analog when one or more signal quality metric values stored in memory from previously received audio samples do not meet a signal quality threshold requirement.

18. The computer readable storage medium of claim 15, where the computer program instructions are further adapted to prevent blending from analog to digital when a plurality of consecutive audio frames failing to meet the signal quality threshold requirement meets or exceeds the threshold count.

19. The computer readable storage medium of claim 15, where the computer program instructions are further adapted to prevent blending from analog to digital when a computed running average computed from the previously computed signal quality metric values is below a predetermined signal quality threshold requirement.

20. The computer readable storage medium of claim 15, where the computer program instructions are further adapted to prevent blending from analog to digital when a majority of the previously computed signal quality metric values is below a predetermined signal quality threshold requirement.

* * * * *